United States Patent
Saraswat et al.

(10) Patent No.: US 10,289,196 B2
(45) Date of Patent: May 14, 2019

(54) TECHNIQUES FOR OCULAR CONTROL

(71) Applicant: North Inc., Kitchener (CA)

(72) Inventors: Ruchir Saraswat, Swindon (GB);
Nicholas Cowley, Wroughton (GB);
Richard Goldman, Cirencester (GB);
Patrick Gerard McGlew,
Romainmotier (CH)

(73) Assignee: North Inc., Kitchener, Ontario (CA)

( * ) Notice: Subject to any disclaimer, the term of this patent is extended or adjusted under 35 U.S.C. 154(b) by 0 days.

(21) Appl. No.: 15/201,364

(22) Filed: Jul. 1, 2016

(65) Prior Publication Data

US 2018/0004284 A1    Jan. 4, 2018

(51) Int. Cl.
*G06F 3/01* (2006.01)
*G06F 3/048* (2013.01)
*G06F 3/0481* (2013.01)

(52) U.S. Cl.
CPC .............. *G06F 3/013* (2013.01); *G06F 3/015* (2013.01); *G06F 3/048* (2013.01); *G06F 3/0481* (2013.01)

(58) Field of Classification Search
None
See application file for complete search history.

(56) References Cited

U.S. PATENT DOCUMENTS

| 2006/0061544 | A1* | 3/2006 | Min | G02B 27/0093 |
| | | | | 345/156 |
| 2014/0347265 | A1* | 11/2014 | Aimone | G09G 3/003 |
| | | | | 345/156 |
| 2014/0375545 | A1 | 12/2014 | Ackerman et al. | |
| 2015/0029088 | A1 | 1/2015 | Kim et al. | |
| 2015/0157255 | A1* | 6/2015 | Nduka | A61B 5/165 |
| | | | | 600/301 |
| 2016/0007849 | A1 | 1/2016 | Krueger | |
| 2016/0025975 | A1 | 1/2016 | Rabii | |
| 2017/0150897 | A1* | 6/2017 | Komaki | A61B 3/113 |

OTHER PUBLICATIONS

International Search Report received for PCT Patent Application No. PCT/US2017/036308, dated Oct. 30, 2017, 3 pages.

* cited by examiner

*Primary Examiner* — Stephen T. Reed
(74) *Attorney, Agent, or Firm* — Thomas Mahon

(57) ABSTRACT

An ocular control system arranged to determine electric potentials associated with a set of sensor. The ocular control system may determine direction of gaze or motion based on the determined electric potentials. The determined direction of gaze or motion may be used to provide data input for a computing device.

23 Claims, 11 Drawing Sheets

Determine a bridge electric potential associated with a first sensor
602

Determine a temple electric potential associated with a second sensor
604

Generate a conditioned bit stream based on the bridge and temple electric potentials
606

*FIG. 8*

Storage Medium 800

Computer Executable Instructions for 600

Computer Executable Instructions for 700

TECHNIQUES FOR OCULAR CONTROL

BACKGROUND

Ocular control can refer to the use of eye tracking to generate output for interacting with remote logic circuitry, such as a computer. In general, eye tracking is the process of measuring either the point of gaze (i.e., where one is looking) or the motion of an eye relative to the head of a user. Typically, tracking the point of gaze or eye motion of a user is utilized to collect data on how people interact visually with their environment. The collected data may be used for any number of purposes. For example, an ocular control device may utilize eye tracking to generate output for interacting with a device, such as controlling a cursor generated by a computer or providing information on a user for marketing or design purposes.

BRIEF DESCRIPTION OF THE DRAWINGS

FIG. 6 illustrates an embodiment of a first logic flow.

FIG. 8 illustrates an embodiment of a storage medium.

DETAILED DESCRIPTION

Figure 1A:
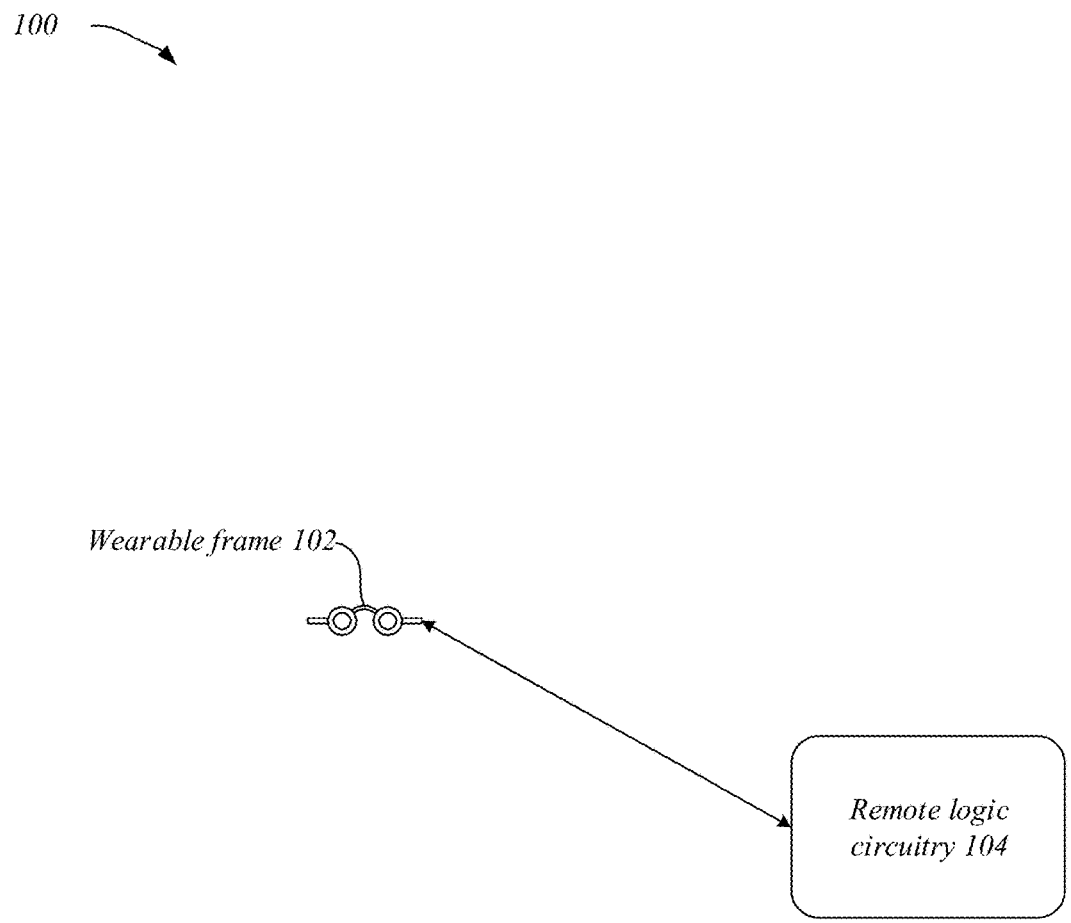
FIG. 1A illustrates an embodiment of an ocular control system.

Various embodiments are generally directed to techniques for ocular control. Some embodiments are particularly directed to an ocular control system based on measuring an electrical property, such as, for instance, electric potentials associated with a biological eye ("eye"). In some embodiments, output for interacting with a device may be generated by the ocular control system based on the measured electrical property. Interaction with a device may include providing data to perform a task with remote logic circuitry or achieve a task of the remote logic circuitry. Various embodiments described herein may measure an electrical property at two or more unique locations with respect to an eye to determine motion or point of gaze of the eye. For instance, an electric potential measured by a first sensor coupled to a wearable frame may be compared to an electric potential measured by a second sensor coupled to the wearable frame to determine motion or point of gaze of the eye.

Some challenges facing ocular control systems include excessively complex, bulky, impractical, and inefficient techniques for tracking eye movement. For example, systems can require stereo cameras to track eye movement, resulting in an unnecessarily large and heavy device with several performance limitations. With stereo camera devices, the ability to track eye movement is compromised by observation distance, making them impractical for many applications, such as game interaction, for instance. Further, operating stereo cameras requires considerable processing and power resources and generates excessive heat. Adding further to the complexity, many systems require a sensor to be located in the line of sight. Requiring a sensor to be located in the line of sight can create unnecessary performance limitations. For example, sensors located in the line of sight can result in vision obstruction, faulty eye tracking, and poor aesthetics. These factors may result in ocular control system with poor performance and limited applications. Such limitations can drastically reduce the usability and applicability of ocular control, contributing to inefficient systems with reduced capabilities.

Various embodiments described herein include an ocular control system based on measuring an electrical property ("electroocular system") to efficiently and accurately track an eye. The electroocular system may track an eye by determining point of gaze or motion of an eye based on measurement of an electrical property of the eye. In various embodiments, the wearable frame may generate output to interact with remote logic circuitry based on a determined point of gaze or movement of an eye. Based on the output, a task may be performed with or achieved by remote logic circuitry. The electroocular system can remove the requirement of a detector to be located in the line of sight, allowing use in systems where a sensor cannot be placed in front of the eye, such as for aesthetic or vision obstructions reasons. Further, without the need for a detector in the line of sight, clear lenses become possible. The electroocular system can remove the need for an observation device (e.g., stereo camera), reducing the physical bulk and weight, thereby making the electroocular system more ergonomic. Additionally, the electroocular system can greatly reduce power requirements because only small voltages may be measured, which require less energy to measure and less energy to communicate. For instance, the bandwidth of a communication signal for a voltage measurement can be low (e.g., few 100 Hz) compared to the bandwidth of a communication signal for a video stream (e.g., few MHz), hence the power requirement to capture and process a communication signal for a voltage measurement is relatively low. Also, reduced power requirements results in reduced heat dissipation, further enhancing comfort and performance of the electroocular system. In these and other ways the electroocular system may enable robust and efficient ocular control to achieve better performing and more dynamic ocular control systems, resulting in several technical effects and advantages.

In various embodiments, the electroocular system may include a wearable frame comprising a bridge portion and a temple portion. A first sensor may be coupled to the wearable frame proximate the bridge portion and a second sensor may be coupled to the wearable frame proximate the temple portion. Logic, at least a portion of which is comprised in circuitry coupled to the first sensor and the second sensor, may determine a bridge electric potential associated with the first sensor and a temple electric potential associated with the second sensor. Based on the bridge and temple electric potentials, the logic may generate a conditioned bit stream. The conditioned bit stream can be used to determine movement and/or determine a point of gaze associated with a biological eye.

With general reference to notations and nomenclature used herein, portions of the detailed description which follows may be presented in terms of program procedures executed on a computer or network of computers. These procedural descriptions and representations are used by those skilled in the art to most effectively convey the substances of their work to others skilled in the art. A procedure is here, and generally, conceived to be a self-consistent sequence of operations leading to a desired result. These operations are those requiring physical manipulations of physical quantities. Usually, though not necessarily, these quantities take the form of electrical, magnetic, or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, these manipulations are often referred to in terms, such as adding or comparing, which are commonly associated with mental operations performed by a human operator. However, no such capability of a human operator is necessary, or desirable in most cases, in any of the operations described herein that form part of one or more embodiments. Rather, these operations are machine operations. Useful machines for performing operations of various embodiments include general purpose digital computers as selectively activated or configured by a computer program stored within that is written in accordance with the teachings herein, and/or include apparatus specially constructed for the required purpose. Various embodiments also relate to apparatus or systems for performing these operations. These apparatus may be specially constructed for the required purpose or may include a general-purpose computer. The required structure for a variety of these machines will be apparent from the description given.

Reference is now made to the drawings, wherein like reference numerals are used to refer to like elements throughout. In the following description, for purpose of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modification, equivalents, and alternatives within the scope of the claims.

FIG. 1A illustrates one embodiment of an ocular control system 100. Ocular control system 100 may include a wearable frame 102 and remote logic circuitry 104. Wearable frame 102 may measure an electrical property and generate output based on measurement of the electrical property. For example, wearable frame 102 may include one or more sensors (see e.g., FIGS. 2-4B). The sensors may generate unique analogue signals based on measurement of the electrical property. An analogue to digital converter (ADC) may convert the analogue signal into a digital signal. In some embodiments wearable frame 102 may include one or more ADCs to convert analogue signals into digital signals. Various embodiments described herein may refer to this digital signal as a raw bit stream or detected electrical signal. The wearable frame 102 may communicate the output to remote logic circuitry 104 via a communication signal. In various embodiments, the remote logic circuitry may perform one or more tasks or operations based on the communication signal. For instance, wearable frame 102 may measure an electric potential at two or more unique locations and generate output based on a comparison of electric potentials for at least two unique locations. Embodiments are not limited in this context.

Figure 1B:
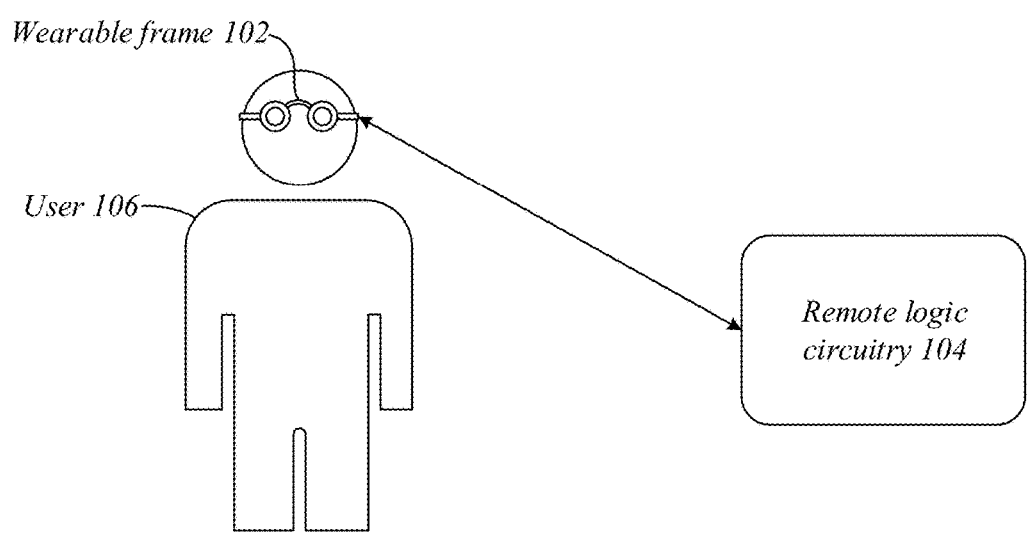
FIG. 1B illustrates an embodiment of an ocular control system in conjunction with a user.

FIG. 1B illustrates an embodiment of an ocular control system 100 in conjunction with a user 106. In various embodiments wearable frame 102 may be used to perform ocular control by determining motion or point of gaze of user 106. More particularly, user 106 may wear wearable frame 102 (e.g., eye glasses, sunglasses, helmet, hat, headband, etc.) and a motion or point of gaze of user's eyes may be determined based on an electric potential generated by one or both of the user's eyes and measured by wearable frame 102. This is described in greater detail below. However, in general, wearable frame 102 may determine motion or point of gaze of user 106 by measuring an electrical property of one or more eyes of the user 106. For instance, an electric potential measured at a first location with respect to an eye may be compared to an electric potential measured at a second location with respect to the eye to determine motion or point of gaze of the eye. In another example an electric potential measured with respect to a left eye and an electric potential measured with respect to a right eye may be compared to a common electric potential measured with respect to both the left and right eyes. Embodiments are not limited in this context.

Figure 2:
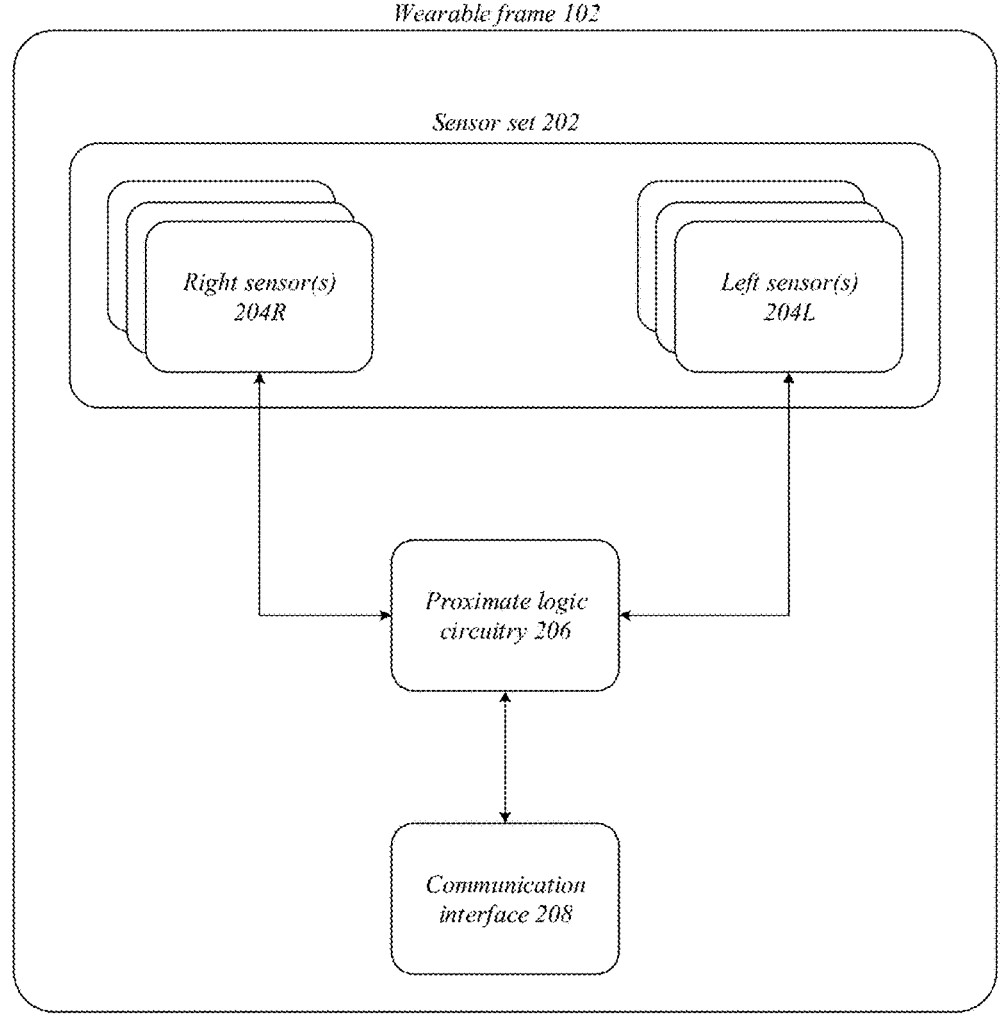
FIG. 2 illustrates a block diagram of an embodiment of a wearable frame.

FIG. 2 illustrates a block diagram of an embodiment of wearable frame 102. Wearable frame 102 may include sensor set 202, proximate logic circuitry 206, and communication interface 208. Sensor set 202 may include one or more right sensors 204R and one or more left sensors 204L. In some embodiments, the right sensors 204R may be referred to as a first sensor subset and the left sensors 204L may be referred to as a second sensor subset. The one or more right sensors 204R may measure electrical energy associated with a right eye and the one or more left sensors 204L may measure electrical energy associated with a left eye. In some embodiments, the right and left sensors 204R, 204L may include a galvanic sensor. Embodiments are not limited in this context.

The components of wearable frame 102 may operate to detect electrical signals that may be used as a data input method to a computing device (e.g., remote logic circuitry 104 or proximate logic circuitry 206). In various embodiments, the detected electrical signals may be the electric potential between the front and rear of an eye or each eye in a pair of eyes. For example, a bridge electric potential and a temple electric potential may be detected or determined for an eye or each eye in a pair of eyes. In various such embodiments, each detected electrical signal may indicate the electric potential between the front and rear of the eye or each eye in a pair of eyes at a different location with respect to the eye or each eye in the pair of eyes. In some embodiments, each electrical signal may be detected by a sensor. For example, each right sensor 204R may detect an electric potential between the front and rear of a right eye in a pair of eyes at different locations with respect to the right eye and each left sensor 204L may detect an electrical potential between the front and rear of a left eye in the pair of eyes with respect to the left eye.

As may be appreciated, the location and number of sensors in sensor set 202 may be varied without departing from the scope of this disclosure. For example, wearable frame 102 may include a helmet, such as a full face helmet, with sensors located therein. The full face helmet may enable sensors to be positioned in more or different locations with respect to an eye. In another example, a common sensor may detect a separate electric potential between the front and rear of each eye in a pair of eyes. In some embodiments, additional or different sensors in sensor set 202 may improve the accuracy with which motion or a direction of gaze of an eye can be determined.

As previously mentioned, the detected electrical signals may be used as a data input method to a computing device (e.g., remote logic circuitry 104 or proximate logic circuitry 206). In some embodiments, the detected electrical signals may be referred to as raw bit streams. In various embodiments, the detected electrical signals may be received by proximate logic circuitry 206 for processing. In various embodiments, proximate logic circuitry 206 may determine an electric potential associated with an eye based on the raw bit stream. The detected electrical signals or raw bit streams may refer to digital signals resulting from analogue signals that are based on measurement of an electric potential passing through an ADC. In various embodiments, the analogue signals may pass through a low noise amplifier prior to passing through the ADC to create the detected electrical signal or raw bit stream. In some embodiments, after being converted into the detected electrical signal or raw bit stream, proximate logic circuitry 206 may perform further two dimensional processing. In some embodiments, signals for each eye may be processed in parallel. Processing signals for each eye in parallel may be used to improve accuracy. Processing of the detected electrical signals by proximate logic circuitry 206 may result in generation of a conditioned bit stream. For example, proximate logic circuitry 206 may compare signals from different sensors (e.g., a bridge electric potential and a temple electric potential) to generate the conditioned bit stream. In some embodiments, the conditioned bit stream may include the data input. In some embodiments, the conditioned bit stream may be passed to communication interface 208 for transmission to a separate computing device via a communication signal. In some embodiments, the communication signal may be generated based on the raw bit stream or an electric potential determined from the raw bit stream.

In some embodiments, communications interface 208 may communicatively couple wearable frame 102 to the computing device (e.g., remote logic circuitry 104) for providing the data input. In various embodiments, communications interface 208 may include components for wireless communication. In various such embodiments, communications interface 208 may include one or more of a radio frequency (RF) system on a chip (SOC), a Bluetooth receiver, a Bluetooth transmitter, a wireless local area network (WLAN) radio, optical communication device, and similar wireless communications hardware. In some embodiments, communications interface 208 may include a plug for wired communication. For instance, communications interface 208 may communicatively couple with remote logic circuitry 104 via an Ethernet cable. In some embodiments, communication interface 208 may enable bidirectional communication between wearable frame 102 and the computing device communicatively coupled to the wearable frame 102. In various embodiments, further processing of communications received from wearable frame 102 may be performed by the computing device communicatively coupled to wearable frame 102 (e.g., remote logic circuitry 104).

The data input generated by wearable frame 102 can be used for a number of purposes including, but not limited to, the following. In some embodiments, the data input may be used for wake on gaze, for example, to wake a computing device receiving the data input. In some embodiments, the data input may be used for an ocular cursor. An ocular cursor may use eye movements as a cursor function to scroll through data or to update a display, such as a display within wearable frame 102 or remote from wearable frame 102. In various embodiments, the data input may be used for external device control (e.g., remote logic circuitry 104). In various such embodiments, eye movements may be used to control interaction with an external computing device through RF communications embedded in the wearable frame 102.

In various embodiments, wearable frame 102 may incorporate video feedback. In various such embodiments, the tracking of eye movement through electroocular signals may be tracked against a transmitted image. In some embodiments a bidirectional link may transmit the image to a display. In some embodiments, wearable frame 102 may be connected by a wired link to a separate processor and wireless interface device. In various embodiments, the wearable frame 102 may be used to enhance game play by providing feedback in the game in response to detected eye movements.

In some embodiments, eye movement may be used to select items or options in a menu. For instance, selection of items or options in a menu may be used to enhance online shopping by enabling product selection via wearable frame 102. For instance, when an eye is stable on a selection for a predetermined amount of time, the user (e.g., user 106 of FIG. 1B) may be asked if they wish to select the item. The user may respond by directing their gaze to a 'yes' option on the menu for a predetermined amount of time.

In various embodiments, calibration of the eye detection signal may be performed. For example, a user (e.g., user 106 of FIG. 1B) may be asked to track movement of an element of a user interface displayed on a display device. Signals (e.g., from sensor set 202, or the like) can be recorded and eye movement detection calibrated based on the signals generated from tracking movement of the user interface element.

As may be appreciated, the location or positioning of one or more portions or components of wearable frame 102 described herein may be varied with respect to a user (e.g., user 106) without departing from the scope of this disclosure. For example, one or more of proximate logic circuitry 206 and communication interface 208 may be coupled to the user independently of wearable frame 102. In such examples, one or more of proximate logic circuitry 206 and communication interface 208 may be worn on the user's body, such as with a belt. In another example, one or more portions of remote logic circuitry 104 may couple to the user's body. In some embodiments, locating various components of ocular control system 100 on the body of a user remote from wearable frame 102 may improve functionality and ergonomics of the ocular control system 100.

Figure 3:
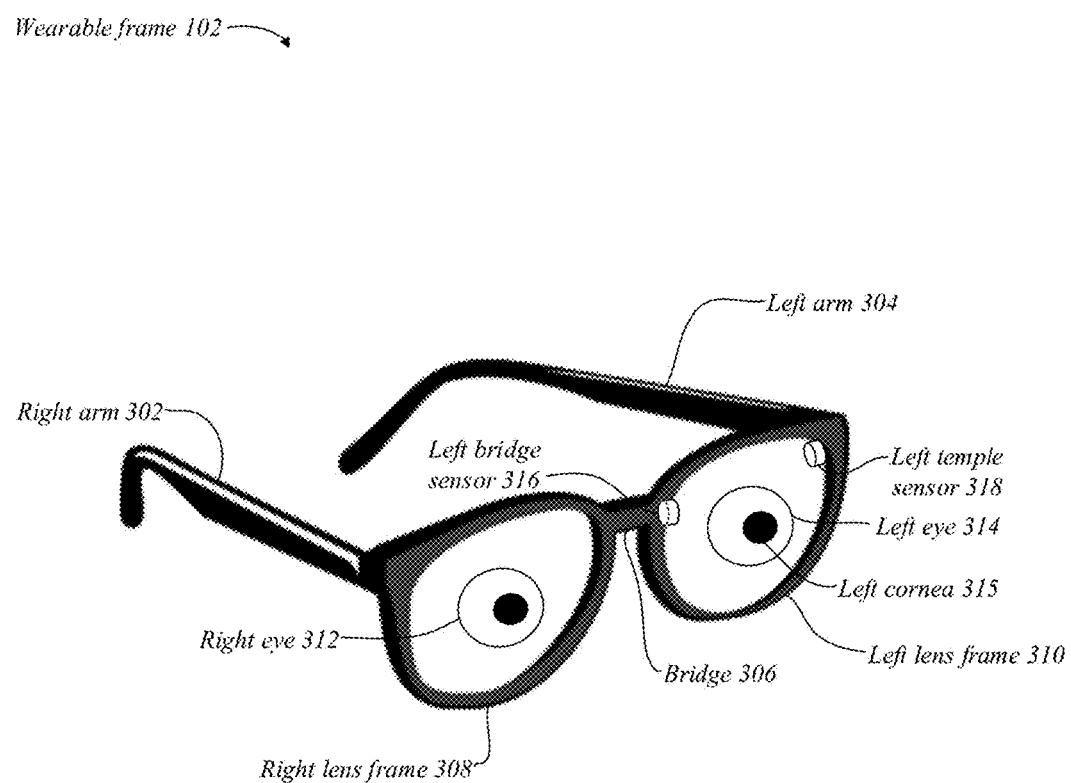
FIG. 3 illustrates an embodiment of a wearable frame.

FIG. 3 illustrates an embodiment of wearable frame 102. In the illustrated embodiment, wearable frame 102 may include eye glass frames. In various embodiments, wearable frames 102 may include any device able to properly position sensor set 202 for detection of electric potentials between the front and rear of a right eye 312 and/or a left eye 314. For instance, wearable frame 102 may include a headband, a hat, a mask, a helmet, or similar head worn devices. Further, the number and position of sensors in sensor set 202 of wearable frame 102 may be altered without departing from the scope of this disclosure. In various embodiments, one or more components described herein, such as those illustrated in FIG. 2 may be mounted to or embedded in wearable frame 102. Embodiments are not limited in this context.

In the illustrated embodiment, wearable frame 102 may include right arm 302, left arm 304, bridge 306, right lens frame 308, and left lens frame 310. In various embodiments, proximate logic circuitry 206, communications interface 208, and a power source may be embedded in one or more of the right arm 302 and the left arm 304. In some embodiments, the right sensors 204R may be embedded in or mounted to one or more of the right arm 302, the right lens frame 308, and bridge 306. In some embodiments, the left sensors 204L may be embedded in or mounted to one or more of the left arm 304, the left lens frame 310, and bridge 306. In the illustrated embodiment, the left sensors 204L include a left bridge sensor 316 and a left temple sensor 318. The left temple sensor 318 may be mounted to left arm 304 and the left bridge sensor 316 may be mounted to bridge 306. In some embodiments, one or more portions of wearable frame 102 may include suitable projections to facilitate positioning sensors 204R, 204L in proximity to an eye.

The wearable frame 102 may exploit the principle that an electrical potential is generated between the front and rear of an eye (e.g., right eye 312, left eye 314). The electrical potential may be detected by positioning a sensor on either side of the eye via wearable frame 102. For example, a left bridge sensor 316 may be placed on a first side of the left eye 314 by being mounted to bridge 306 and a left temple sensor 318 may be placed on a second side of left eye 314 by being mounted to left arm 304. Left eye 314 may act as a dipole in which the anterior pole is positive and the posterior pole is negative. When a left gaze occurs, the cornea 315 of the left eye 314 may approach a sensor near the outer canthus of the left eye (e.g., left temple sensor 318), resulting in a negative-trending change in the recorded potential difference between the sensors on each side of the left eye 314. When a right gaze occurs, the cornea 315 of the left eye 314 may approach a sensor near the inner canthus of the left eye (e.g., left bridge sensor 316), resulting in a positive-trending change in the recorded potential difference between the sensors on each side of the left eye 314. When an upward gaze occurs, a first common mode response in the recorded potential difference between the sensors on each side of the left eye 314 may result. When a downward gaze occurs, a second common mode response in the recorded potential difference between the sensors on each side of the left eye 314 may result. In some embodiments, the first and second common mode responses in the recorded potential difference between the sensors on each side of the eye may have opposite signs.

In various embodiments, potential differences for a pair of eyes (e.g., right eye 312 and left eye 314) may be recorded simultaneously. In various such embodiments, an arrangement similar to the sensor arrangement described with respect to the left eye 314 may be utilized for right eye 312. In various such embodiments, the potential differences for each eye in the pair may be processed in parallel. Processing the potential differences for each eye of a pair in parallel may improve accuracy of the ocular control system 100.

Figure 4A:
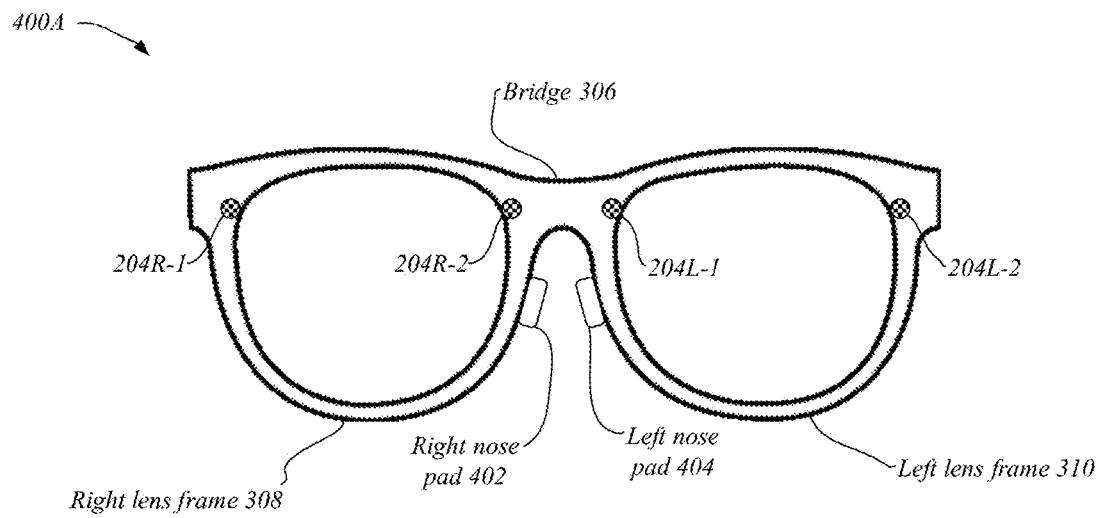
FIG. 4A illustrates a first arrangement of a sensor set for a wearable frame.

FIG. 4A illustrates a first arrangement 400A of sensor set 202 for wearable frame 102. As can be seen, arrangement 400A may include two right sensors 204R-1, 204R-2 and two left sensors 204L-1, 204L-2. The right sensors 204R-1, 204R-2 may be embedded in the right lens frame 308 and the left sensors 204L-1, 204L-2 may be embedded in the left lens frame 310. In some embodiments, the two left sensors 204L-1, 204L-2 may be the same or similar to left bridge sensor 316 and left temple sensor 318 of FIG. 3. In some embodiments, right sensor 204R-1 may be embedded in right arm 302 (FIG. 3) and left sensor 204L-2 may be embedded in left arm 304 (FIG. 3). In various embodiments, right sensor 204R-2 and left sensor 204L-1 may be embedded in bridge 306. In various such embodiments, bridge 306 may include right nose pad 402 and left nose pad 404. In some embodiments, right nose pad 402 may have right sensor 204R-2 embedded therein and left nose pad 404 may have left sensor 204L-1 embedded therein. Embodiments are not limited in this context.

In the illustrated embodiment, detection of movement of an eye in the horizontal plane of wearable frame 102 can be detected in both eyes by measurement of differential signals between each of the left sensors 204L and each of the right sensors 204R. Detection of movement in the vertical plane of wearable frame 102 may be detected with the common mode. In various embodiments, right sensor 204R-2 and left sensor 204L-1 may be combined into a common sensor. In some embodiments, a left eye temple electric potential may be detected by sensor 204L-2 and a right eye temple electric potential may be detected by sensor 204R-1. In some embodiments, a left eye bridge electric potential may be detected by sensor 204L-1 and a left eye bridge electric potential may be detect by sensor 204R-2. In various embodiments, one or more conditioned bit streams may be generated by processing or analyzing signals from sensors 204R-1, 204R-2, 204L-1, 204L-2.

Figure 4B:
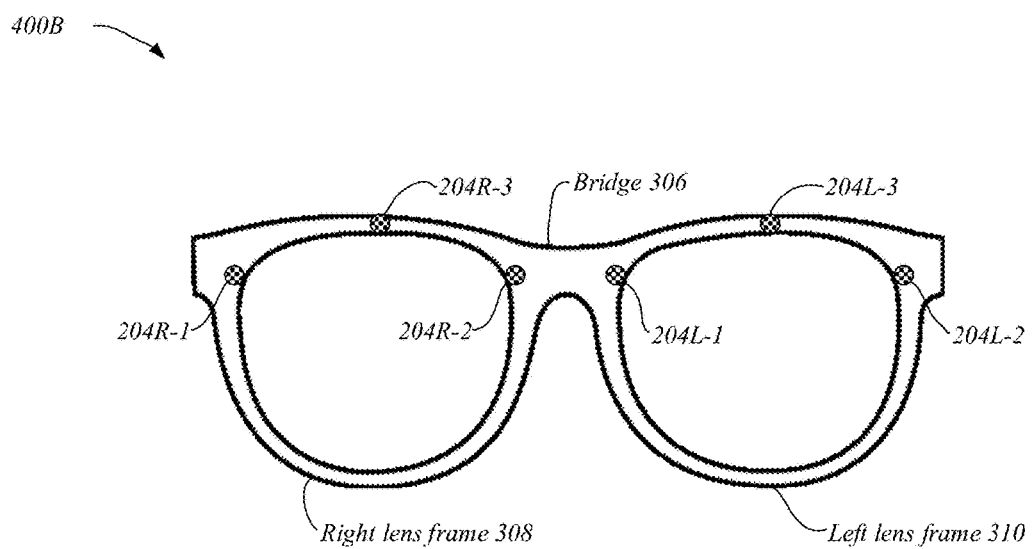
FIG. 4B illustrates a second arrangement of a sensor set for a wearable frame.

FIG. 4B illustrates a second arrangement 400B of sensor set 202 for wearable frame 102. As can be seen, arrangement 400B may include sensors 204R-1, 204R-2, 204L-1, 204L-2 of arrangement 400A. Additionally, arrangement 300B may include right sensor 204R-3 and left sensor 204L-3. The right sensor 204R-3 may be embedded in right lens frame 308 and left sensor 204L-3 may be embedded in left lens frame 310. Embodiments are not limited in this context.

In the illustrated embodiment, horizontal eye movement may again be detected by differential signals between sensors for each respective eye. In some embodiments, the differential signals may be compared to determine a differential value. Direction of gaze or movement of the eye may be determined based on comparison of one or more differential values. Vertical eye movement may be detected in the right eye by comparing the signal from right sensor 204R-3 to both right sensors 204R-1, 204R-2. Vertical eye movement may be detected in the left eye by comparing the signal from left sensor 204L-3 to both left sensors 204L-1, 204L-2. In some embodiments, a left eye common electric potential may be detected by sensor 204L-3 and a right eye common electric potential may be detected by sensor 204R-3. In various embodiments, one or more conditioned bit streams may be generated by processing or analyzing signals from sensors 204R-1, 204R-2, 204R-3, 204L-1, 204L-2, 204L-3.

Figure 5:
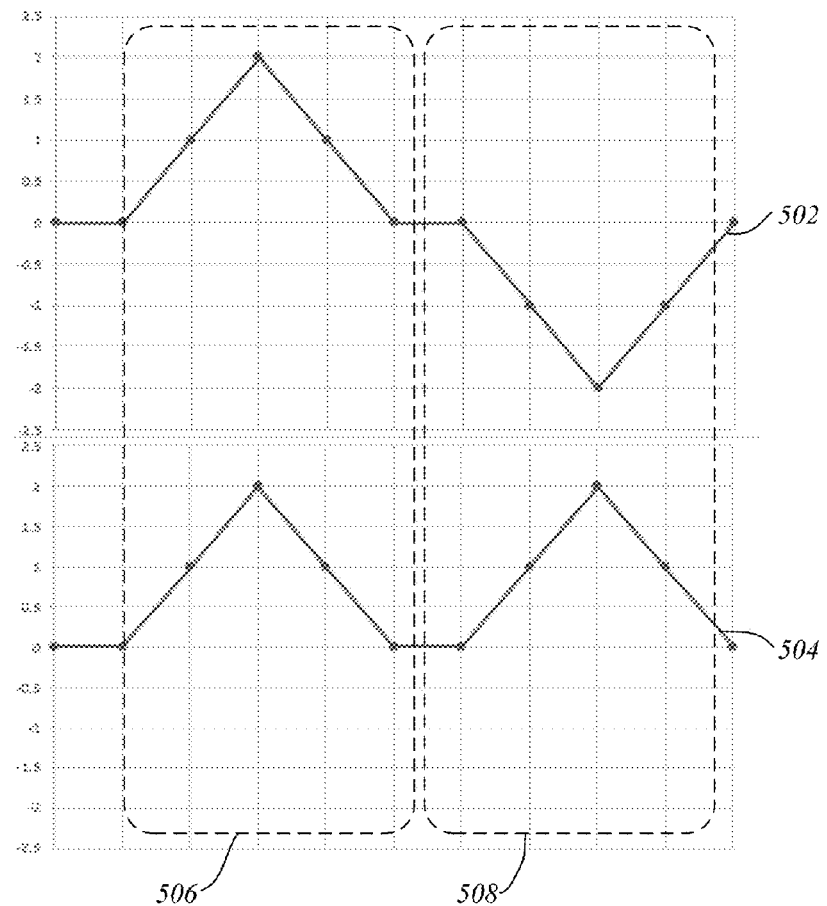
FIG. 5 illustrates an embodiment of sensor signals generated by an exemplary ocular control system.

FIG. 5 illustrates an embodiment of sensor signals generated by an exemplary ocular control system 100. Signal 502 may be generated by a first sensor (e.g., 204R-1) and signal 504 may be generated by a second sensor (e.g., 204R-2). Section 506 may illustrate a common mode response from the first and second sensors. Common mode response may be indicated by a shift in the detected signals in the same direction for both the first and second sensors. In some embodiments, the common mode response from the first and second sensors signals may indicate a vertical movement of the eye. Section 508 may illustrate a differential response from the first and second sensors. Differential response may be indicated by a shift in the detected signals in opposite directions for the first and second sensors. In some embodiments, the differential response from the first and second sensor signals may indicate a horizontal movement of the eye. For example, a negative-trending change may be associated with a left gaze and a positive-trending change may be associated with a right gaze. Embodiments are not limited in this context.

FIG. 6 illustrates one embodiments of a logic flow 600. The logic flow 600 may be representative of some or all of the operations executed by one or more embodiments described herein, such as ocular control system 100 or wearable frame 102. Embodiments are not limited in this context.

In the illustrated embodiment shown in FIG. 6, the logic flow 600 may begin at block 602. At block 602 "determine a bridge electric potential associated with a first sensor" a bridge electric potential can be determined from a first sensor. For example, bridge electrical potential can be determined from a sensor proximate to a bridge portion of frame 102 (e.g., sensor 204R-2, sensor 204L-1, left bridge sensor 316, or the like). With various embodiments, the bridge electric potential may be based on an electric field generated by an eye (e.g., right eye 312, left eye 314). In some embodiments, the first sensor includes a galvanic sensor.

Continuing to block 604 "determine a temple electric potential associated with a second sensor" a temple electric potential can be determined from a second sensor. For example, temple electrical potential can be determined from a sensor proximate to a temple portion of frame 102 (e.g., sensor 204R-1, sensor 204L-2, left temple sensor 318, or the like). With some embodiments, the temple electric potential may be based on an electric field generated by an eye. In various embodiments, the second sensor includes a galvanic sensor.

At block 606 "generate a conditioned bit stream based on the bridge and temple electric potentials", a conditioned bit stream can be generated based on the bridge and temple electric potentials. For example, the conditioned bit stream may be generated by proximate logic circuitry 206 or remote logic circuitry 104. With some embodiments a first differential value may be determined based on a difference in the bridge and temple electric potentials. In various embodiments, the conditioned bit stream may be generated based on the first differential value.

Figure 7:
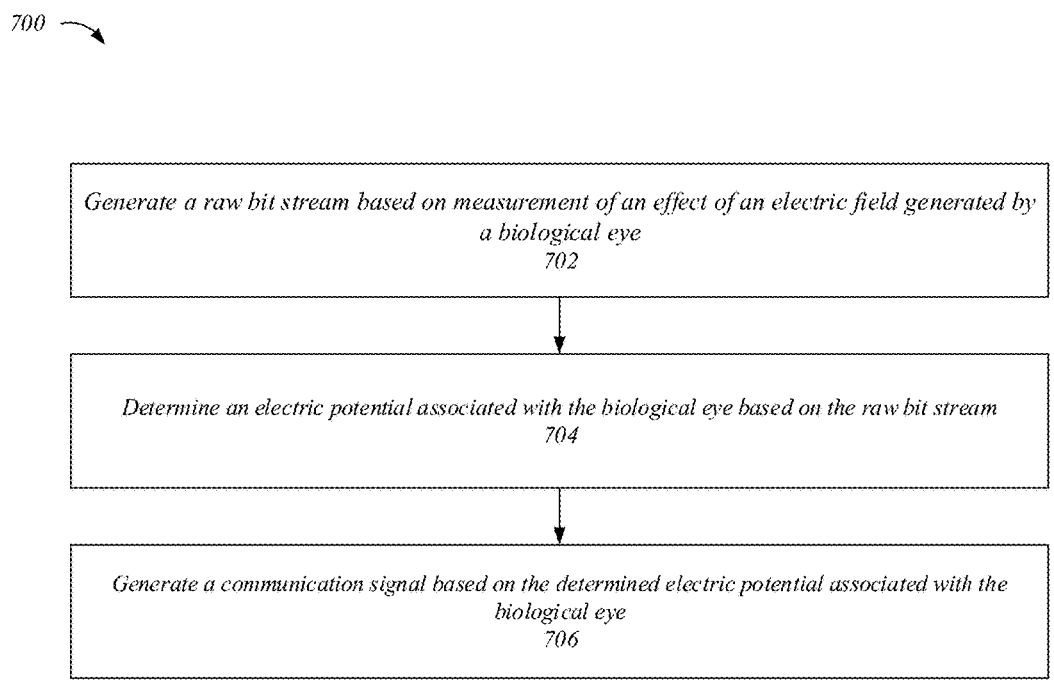
FIG. 7 illustrates an embodiments of a second logic flow.

FIG. 7 illustrates one embodiment of a logic flow 700. The logic flow 700 may be representative of some or all of the operations executed by one or more embodiments described herein, such as ocular control system 100 or wearable frame 102. Embodiments are not limited in this context.

In the illustrated embodiment shown in FIG. 7, the logic flow 700 may begin at block 702. At block 702 "generate a raw bit stream based on measurement of an effect of an electric field generated by a biological eye" a raw bit stream can be generated based on measurement of an effect of an electric field generated by a biological eye. For example, the raw bit stream may be generated by a sensor (e.g., right sensors 204R, left sensors 204L, or the like). In some embodiments, the raw bit stream may be based on an electric potential caused by the electric field generated by the biological eye.

Continuing to block 704 "determine an electric potential associated with the biological eye based on the raw bit stream" an electric potential associated with the biological eye can be determined based on the raw bit stream. For example, proximate logic circuitry 206 may process the raw bit stream to determine an electric potential (e.g., temple electric potential, bridge electric potential, or the like). With various embodiments, movement of the biological eye may be detected based on the raw bit stream. In some embodiments, fixation or gaze of the biological eye may be monitored based on changes in electric potential induced by movement of the biological eye and measured by one or more sensors in the set of sensors 202.

At block 706 "generate a communication signal based on the determined electric potential associated with the biological eye" a communication signal can be generated based on the determined electric potential associated with the biological eye. For instance, communication interface 208 may receive the determined electric potential (e.g., as a conditioned bit stream) from proximate logic circuitry 206 and generate the communication signal based on the determined electric potential. In various embodiments, communication interface 208 may transmit (wired or wirelessly) to remote logic circuitry 104. With some embodiments, the communication signal may be used as data input to the remote logic circuitry 104. For example, remote logic circuitry 104 may include a computing device and the communication signal may be used to control a cursor on the computing device.

FIG. 8 illustrates an embodiment of a storage medium 800. Storage medium 800 may comprise any non-transitory computer-readable storage medium or machine-readable storage medium, such as an optical, magnetic or semiconductor storage medium. In various embodiments, storage medium 800 may comprise an article of manufacture. In some embodiments, storage medium 800 may store computer-executable instructions, such as computer-executable instructions to implement one or more of logic flows or operations described herein, such as with respect to 600 and 700 of FIGS. 6 and 7. Examples of a computer-readable storage medium or machine-readable storage medium may include any tangible media capable of storing electronic data, including volatile memory or non-volatile memory, removable or non-removable memory, erasable or non-erasable memory, writeable or re-writeable memory, and so forth. Examples of computer-executable instructions may include any suitable type of code, such as source code, compiled code, interpreted code, executable code, static code, dynamic code, object-oriented code, visual code, and the like. The embodiments are not limited in this context.

Figure 9:
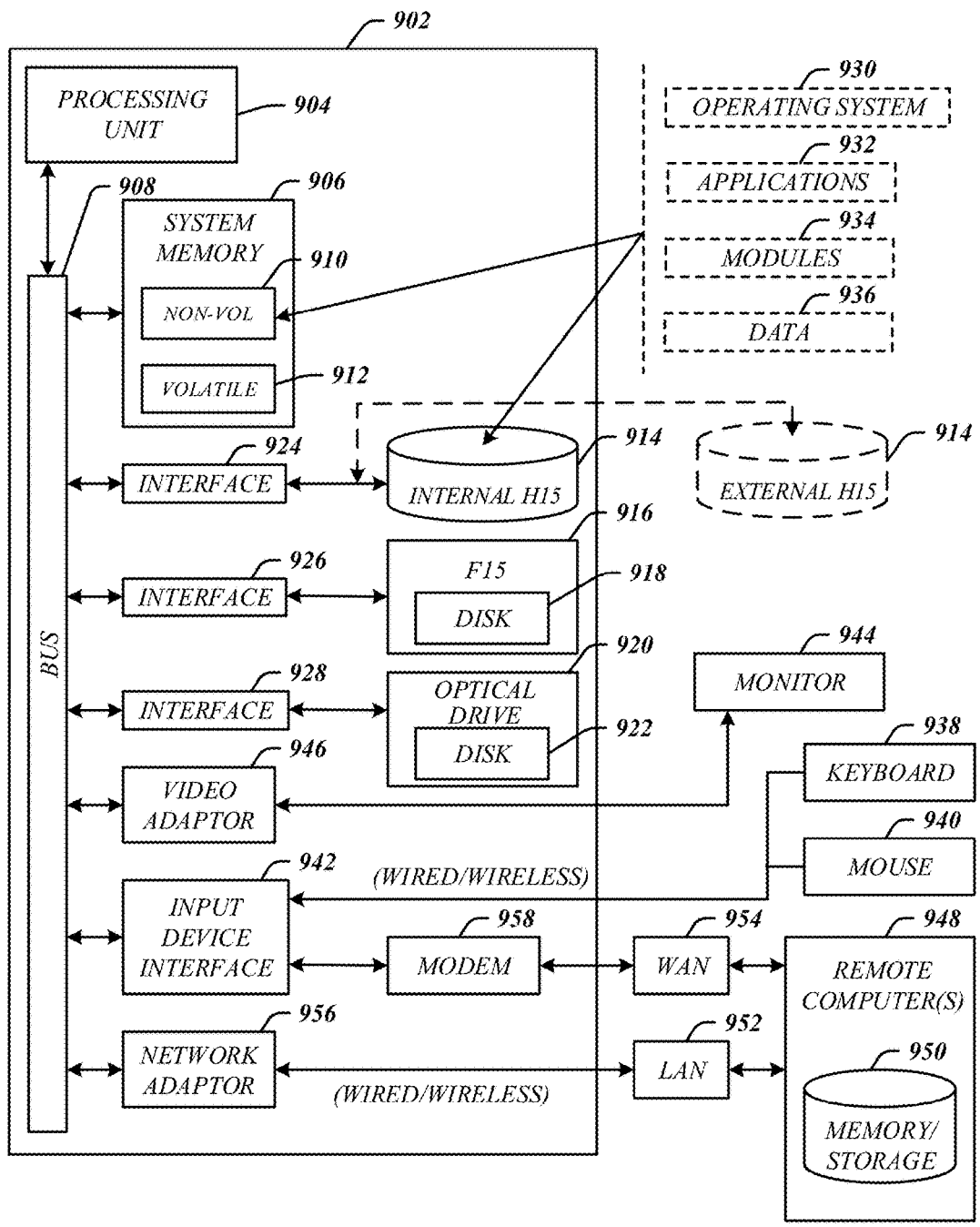
FIG. 9 illustrates an embodiment of a computing architecture.

FIG. 9 illustrates an embodiment of an exemplary computing architecture 900 that may be suitable for implementing various embodiments as previously described. In various embodiments, the computing architecture 900 may comprise or be implemented as part of an electronic device. In some embodiments, the computing architecture 900 may be representative, for example, of a processor server that implements one or more components of the ocular control system 100. In some embodiments, computing architecture 900 may be representative, for example, of a wearable device that implements one or more components of wearable frame 102. The embodiments are not limited in this context.

As used in this application, the terms "system" and "component" and "module" are intended to refer to a computer-related entity, either hardware, a combination of hardware and software, software, or software in execution, examples of which are provided by the exemplary computing architecture 900. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 900 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 900.

As shown in FIG. 9, the computing architecture 900 comprises a processing unit 904, a system memory 906 and a system bus 908. The processing unit 904 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multi-processor architectures may also be employed as the processing unit 904.

The system bus 908 provides an interface for system components including, but not limited to, the system memory 906 to the processing unit 904. The system bus 908 can be any of several types of bus structure that may further interconnect to a memory bus (with or without a memory controller), a peripheral bus, and a local bus using any of a variety of commercially available bus architectures. Interface adapters may connect to the system bus 908 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The system memory 906 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory (e.g., one or more flash arrays), polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 9, the system memory 906 can include non-volatile memory 910 and/or volatile memory 912. A basic input/output system (BIOS) can be stored in the non-volatile memory 910.

The computer 902 may include various types of computer-readable storage media in the form of one or more lower speed memory units, including an internal (or external) hard disk drive (HDD) 914, a magnetic floppy disk drive (FDD) 916 to read from or write to a removable magnetic disk 918, and an optical disk drive 920 to read from or write to a removable optical disk 922 (e.g., a CD-ROM or DVD). The HDD 914, FDD 916 and optical disk drive 920 can be connected to the system bus 908 by a HDD interface 924, an FDD interface 926 and an optical drive interface 928, respectively. The HDD interface 924 for external drive implementations can include at least one or both of Universal Serial Bus (USB) and IEEE 994 interface technologies.

The drives and associated computer-readable media provide volatile and/or nonvolatile storage of data, data structures, computer-executable instructions, and so forth. For example, a number of program modules can be stored in the drives and memory units 910, 912, including an operating system 930, one or more application programs 932, other program modules 934, and program data 936. In one embodiment, the one or more application programs 932, other program modules 934, and program data 936 can include, for example, the various applications and/or components of the ocular control system 100.

A user can enter commands and information into the computer 902 through one or more wire/wireless input devices, for example, a keyboard 938 and a pointing device, such as a mouse 940. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 904 through an input device interface 942 that is coupled to the system bus 908, but can be connected by other interfaces such as a parallel port, IEEE 994 serial port, a game port, a USB port, an IR interface, and so forth.

A monitor 944 or other type of display device is also connected to the system bus 908 via an interface, such as a video adaptor 946. The monitor 944 may be internal or external to the computer 902. In addition to the monitor 944, a computer typically includes other peripheral output devices, such as speakers, printers, and so forth.

The computer 902 may operate in a networked environment using logical connections via wire and/or wireless communications to one or more remote computers, such as a remote computer 948. The remote computer 948 can be a workstation, a server computer, a router, a personal computer, portable computer, microprocessor-based entertainment appliance, a peer device or other common network node, and typically includes many or all of the elements described relative to the computer 902, although, for purposes of brevity, only a memory/storage device 950 is illustrated. The logical connections depicted include wire/wireless connectivity to a local area network (LAN) 952 and/or larger networks, for example, a wide area network (WAN) 954. Such LAN and WAN networking environments are commonplace in offices and companies, and facilitate enterprise-wide computer networks, such as intranets, all of which may connect to a global communications network, for example, the Internet.

When used in a LAN networking environment, the computer 902 is connected to the LAN 952 through a wire and/or wireless communication network interface or adaptor 956. The adaptor 956 can facilitate wire and/or wireless communications to the LAN 952, which may also include a wireless access point disposed thereon for communicating with the wireless functionality of the adaptor 956.

When used in a WAN networking environment, the computer 902 can include a modem 958, or is connected to a communications server on the WAN 954, or has other means for establishing communications over the WAN 954, such as by way of the Internet. The modem 958, which can be internal or external and a wire and/or wireless device, connects to the system bus 908 via the input device interface 942. In a networked environment, program modules depicted relative to the computer 902, or portions thereof, can be stored in the remote memory/storage device 950. It will be appreciated that the network connections shown are exemplary and other means of establishing a communications link between the computers can be used.

The computer 902 is operable to communicate with wire and wireless devices or entities using the IEEE 802 family of standards, such as wireless devices operatively disposed in wireless communication (e.g., IEEE 802.16 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 10:
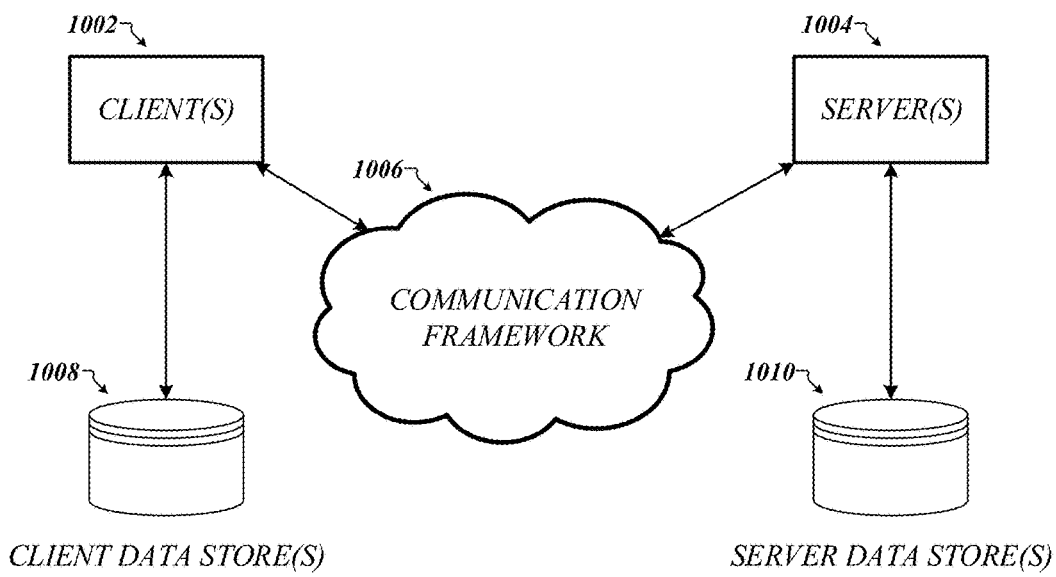
FIG. 10 illustrates an embodiment of a communications architecture.

FIG. 10 illustrates a block diagram of an exemplary communications architecture 1000 suitable for implementing various embodiments as previously described. The communications architecture 1000 includes various common communications elements, such as a transmitter, receiver, transceiver, radio, network interface, baseband processor, antenna, amplifiers, filters, power supplies, and so forth. The embodiments, however, are not limited to implementation by the communications architecture 1000.

As shown in FIG. 10, the communications architecture 1000 comprises includes one or more clients 1002 and servers 1004. The clients 1002 and the servers 1004 are operatively connected to one or more respective client data stores 1008 and server data stores 1010 that can be employed to store information local to the respective clients 1002 and servers 1004, such as cookies and/or associated contextual information. In various embodiments, any one of servers 1004 may implement one or more of logic flows or operations described herein, and storage medium 800 of FIG. 8 in conjunction with storage of data received from any one of clients 1002 on any of server data stores 1010.

The clients 1002 and the servers 1004 may communicate information between each other using a communication framework 1006. The communications framework 1006 may implement any well-known communications techniques and protocols. The communications framework 1006 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 1006 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1900 Base T, and the like), token ring, wireless network interfaces, cellular network interfaces, IEEE 802.11a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 1002 and the servers 1004. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

The following examples pertain to further embodiments, from which numerous permutations and configurations will be apparent.

Example 1 is a system for ocular control, comprising: a wearable frame comprising a bridge portion and a temple portion; a first sensor coupled to the wearable frame proximate the bridge portion; a second sensor coupled to the wearable frame proximate the temple portion; and logic, at least a portion of the logic comprised in circuitry coupled to the first sensor and the second sensor, the logic to determine a bridge electric potential associated with the first sensor and a temple electric potential associated with the second sensor, and generate a conditioned bit stream based on the bridge and temple electric potentials.

Example 2 includes the subject matter of Example 1, the logic to determine a first differential value based on a difference in the bridge and temple electric potentials and generate the conditioned bit stream based on the first differential value.

Example 3 includes the subject matter of Example 2, the logic to determine a second bridge electric potential associated with the first sensor and a second temple electric potential associated with the second sensor.

Example 4 includes the subject matter of Example 3, the logic to determine a second differential value based on a difference in the second bridge and second temple electric potentials and generate the conditioned bit stream based on the first and second differential values.

Example 5 includes the subject matter of Example 4, the logic to compare the first and second differential values and generate the conditioned bit stream based on the comparison.

Example 6 includes the subject matter of Example 5, the logic to determine a negative-trending change based on the comparison and associate the negative-trending change with a left gaze.

Example 7 includes the subject matter of Example 5, the logic to determine a positive-trending change based on the comparison and associate the positive-trending change with a right gaze.

Example 8 includes the subject matter of Example 1, comprising a third sensor coupled to the wearable frame between the bridge portion and the temple portion of the wearable frame, the logic to determine a common electric potential associated with the third sensor.

Example 9 includes the subject matter of Example 8, the logic to determine a first differential value based on a difference in the bridge and common electric potentials and a second differential value based on a difference in the temple and common electric potentials, and generate the conditioned bit stream based on the first and second differential value.

Example 10 includes the subject matter of Example 9, the logic to determine a second bridge electric potential associated with the first sensor, a second temple electric potential associated with the second sensor, and a second common electric potential associated with the third sensor Example 11 includes the subject matter of Example 10, the logic to determine a third differential value based on a difference in the second bridge and second common electric potentials and a fourth differential value based on a difference in the second temple and second common electric potentials and generate the conditioned bit stream based on the first, second, third, and forth differential values.

Example 12 includes the subject matter of Example 11 the logic to determine a fifth differential value based on a difference between the first and third differential values and a sixth differential value based on a difference between the second and fourth differential values.

Example 13 includes the subject matter of Example 11, the logic to compare the fifth and sixth differential values and generate the conditioned bit stream based on the comparison.

Example 14 includes the subject matter of Example 13, the logic to determine an upward gaze based on the comparison.

Example 15 includes the subject matter of Example 13, the logic to determine a downward gaze based on the comparison.

Example 16 includes the subject matter of Example 1, comprising a transmitter to generate a communication signal based on the conditioned bit stream.

Example 17 includes the subject matter of Example 16, the communication signal comprising a wireless signal.

Example 18 includes the subject matter of Example 1, the temple portion of the wearable frame comprising a raised surface to facilitate contact of the second sensor with a temple of a user.

Example 19 is an apparatus comprising: a first sensor in a set of sensors, the first sensor to generate a raw bit stream based on measurement of an effect of an electric field to be generated by a biological eye; logic, at least a portion of the logic comprised in circuitry, the logic to determine an electric potential associated with the biological eye based on the raw bit stream, and generate a communication signal based on the determined electric potential associated with the biological eye.

Example 20 includes the subject matter of Example 19, the logic to detect movement of the biological eye based the raw bit stream.

Example 21 includes the subject matter of Example 19, the logic to determine an object of fixation or direction of gaze for the biological eye based on the raw bit steam.

Example 22 includes the subject matter of Example 19, the logic to monitor fixation or gaze of the biological eye based on changes in electric potential induced by movement of the biological eye and measured by the set of sensors.

Example 23 includes the subject matter of Example 19, the set of sensors comprising a second sensor, the second sensor to generate a second raw bit stream based on measurement of an effect of the electric field of the biological eye at a position with respect to the biological eye different than that of the first sensor.

Example 24 includes the subject matter of Example 23, the logic to determine an electric potential between different portions of the biological eye based on the raw bit stream and the second raw bit stream.

Example 25 includes the subject matter of Example 23, the logic to detect movement of the biological eye based on the raw bit stream and the second raw bit stream.

Example 26 includes the subject matter of Example 23, the logic to generate the communication signal based on the raw bit stream and the second raw bit stream.

Example 27 includes the subject matter of Example 23, the logic to determine an object of fixation or direction of gaze for the biological eye based on the raw bit steam and the second raw bit stream.

Example 28 includes the subject matter of Example 27, the logic to generate the communication signal based on the object of fixation or the direction of gaze.

Example 29 includes the subject matter of Example 23, the logic to monitor fixation or gaze of the biological eye based on changes in electric potential induced by movement of the biological eye and measured by the set of sensors.

Example 30 includes the subject matter of Example 23 the set of sensors comprising first and second sensor subsets, the first sensor subset including the first sensor and the second sensor.

Example 31 includes the subject matter of Example 30 the second sensor subset to include third and fourth sensors to generate third and fourth raw bit streams based on measurement of an effect of a second electric field generated by a second biological eye.

Example 32 includes the subject matter of Example 31, the logic to process one or more of the first, second, third, and fourth raw bit streams in parallel.

Example 33 includes the subject matter of Example 31, the logic to generate a second communication signal based on the third and fourth bit streams.

Example 34 includes the subject matter of Example 33, the communication signal comprising the second communication signal.

Example 35 includes the subject matter of Example 32, the logic to detect movement of the biological eye and the second biological eye based on the raw bit streams from the first and second sensor subsets.

Example 36 includes the subject matter of Example 32, the logic to determine an object of fixation or direction of gaze for the biological eye and the second biological eye based on the raw bit steams from the first and second sensor subsets.

Example 37 includes the subject matter of Example 23, the logic to monitor fixation or gaze of the biological eye and the second biological eye based on changes in electric potential induced by movement of the biological eyes and measured by the set of sensors.

Example 38 includes the subject matter of Example 19, the wireless signal to direct one or more functional aspects of a computer system.

Example 39 includes the subject matter of Example 38, the one or more functional aspects of the computer system including positioning a cursor on a display screen.

Example 40 includes the subject matter of Example 38, the one or more functional aspects of the computer system including activation of a gaze sensitive display.

Example 41 includes the subject matter of Example 38, the one or more function aspects of the computer system including providing input to direct an application executed by the computer system.

Example 42 includes the subject matter of Example 41, the application including a virtual environment.

Example 43 includes the subject matter of Example 41, the application including a graphical user interface (GUI).

Example 44 includes the subject matter of Example 41, the application to monitor a physical environment.

Example 45 includes the subject matter of Example 19, the set of sensors comprising galvanic sensors.

Example 46 includes the subject matter of Example 19, the transmitter comprising a radio and an antennae.

Example 47 includes the subject matter of Example 19, the sensor set, the circuitry, the memory, and the transmitter comprising at least a portion of a portable computing device.

Example 48 includes the subject matter of Example 19, the sensor set, the circuitry, the memory, and the transmitter comprising at least a portion of a portable computing device.

Example 49 includes the subject matter of Example 19, comprising a mount, the mount to maintain physical connection between the sensor set, the circuitry, the memory, and the transmitter.

Example 50 includes the subject matter of Example 49, the mount to enclose the circuitry and the memory.

Example 51 includes the subject matter of Example 49, the mount configured to make physical contact with a user.

Example 52 includes the subject matter of Example 51, the physical contact including contact with a nose or an ear.

Example 53 includes the subject matter of Example 52, the mount comprising eyeglass frames.

Example 54 includes the subject matter of Example 53, the sensor set comprising at least two sensors with at least a portion of each of the at least two sensors is embedded in the eyeglass frames.

Example 55 includes the subject matter of Example 19, the set of sensors comprising a second sensor, the second sensor to generate a second raw bit stream based on measurement of an effect of a second electric field to be generated by a second biological eye.

Example 56 includes the subject matter of Example 55, the logic to detect movement of the biological eye and the second biological eye based the raw bit stream and the second raw bit stream.

Example 57 includes the subject matter of Example 56, the logic to process the first and second raw bit streams in parallel.

Example 58 includes the subject matter of Example 55, the logic to determine an object of fixation or direction of gaze for the biological eye and the second biological eye based the raw bit steam and the second raw bit stream.

Example 59 includes the subject matter of Example 55, the logic to monitor fixation or gaze of the biological eye and the second biological eye based on changes in electric potential induced by movement of the biological eyes and measured by the set of sensors.

Example 60 is one or more computer-readable media to store instructions that when executed by a processor circuit causes the processor circuit to: determine a bridge electric potential associated with a first sensor; determine a temple electric potential associated with a second sensor; and generate a conditioned bit stream based on the bridge and temple electric potentials.

Example 61 includes the subject matter of Example 60, with instructions to determine a first differential value based on a difference in the bridge and temple electric potentials and generate the conditioned bit stream based on the first differential value.

Example 62 includes the subject matter of Example 61, with instructions to determine a second bridge electric potential associated with the first sensor and a second temple electric potential associated with the second sensor.

Example 63 includes the subject matter of Example 62, with instructions to determine a second differential value based on a difference in the second bridge and second temple electric potentials and generate the conditioned bit stream based on the first and second differential values.

Example 64 includes the subject matter of Example 63, with instructions to compare the first and second differential values and generate the conditioned bit stream based on the comparison.

Example 65 includes the subject matter of Example 64, with instructions to determine a negative-trending change based on the comparison and associate the negative-trending change with a left gaze.

Example 66 includes the subject matter of Example 64, with instructions to determine a positive-trending change based on the comparison and associate the positive-trending change with a right gaze.

Example 67 is an apparatus, comprising: measurement means to generate a raw bit stream based on measurement of an effect of an electric field to be generated by a biological eye; analysis means to determine an electric potential associated with the biological eye based on the raw bit stream; and communication means to generate a communication signal based on the determined electric potential associated with the biological eye.

Example 68 includes the subject matter of Example 67, the analysis means to detect movement of the biological eye based on the raw bit stream.

Example 69 includes the subject matter of Example 67, the analysis means to determine an object of fixation or direction of gaze for the biological eye based on the raw bit stream.

Example 70 includes the subject matter of Example 67, the analysis means to determine an object of fixation or direction of gaze of the biological eye based on changes in electric potential induced by movement of the biological eye.

The foregoing description of example embodiments has been presented for the purposes of illustration and description. It is not intended to be exhaustive or to limit the present disclosure to the precise forms disclosed. Many modifications and variations are possible in light of this disclosure. It is intended that the scope of the present disclosure be limited not by this detailed description, but rather by the claims appended hereto. Future filed applications claiming priority to this application may claim the disclosed subject matter in a different manner, and may generally include any set of one or more limitations as variously disclosed or otherwise demonstrated herein.

The invention claimed is:

1. A system, comprising:
   a wearable frame comprising a bridge portion and a temple portion;
   a first sensor coupled to the wearable frame proximate the bridge portion;
   a second sensor coupled to the wearable frame proximate the temple portions, the first sensor and the second sensor coupled to the wearable frame at least above a mid-point of a line of sight of the wearable frame;
   a third sensor coupled to the wearable frame between the bridge portion and the temple portion of the wearable frame;
   a processor coupled to the first sensor, the second sensor and the third sensor; and
   a memory comprising a set of instructions, which when executed by the processor, cause the processor to:
      determine a bridge electric potential associated with the first sensor,
      determine a temple electric potential associated with the second sensor,
      determine a common electric potential associated with the third sensor,
      determine a first differential value based on a difference in the bridge and common electric potentials,
      determine a second differential value based on a difference in the temple and common electric potentials, and
      generate a conditioned bit stream based on the first differential value and the second differential value.

2. The system of claim 1, the set of instructions, which when executed by the processor, cause the processor to determine a first differential value based on a difference in the bridge and temple electric potentials and generate the conditioned bit stream based on the first differential value.

3. The system of claim 2, the set of instructions, which when executed by the processor, cause the processor to determine a second bridge electric potential associated with the first sensor and a second temple electric potential associated with the second sensor.

4. The system of claim 3, the set of instructions, which when executed by the processor, cause the processor to determine a second differential value based on a difference in the second bridge and second temple electric potentials and generate the conditioned bit stream based on the first and second differential values.

5. The system of claim 4, the set of instructions, which when executed by the processor, cause the processor to compare the first and second differential values and generate the conditioned bit stream based on the comparison.

6. The system of claim 5, the set of instructions, which when executed by the processor, cause the processor to determine a negative-trending change based on the comparison and associate the negative-trending change with a left gaze.

7. The system of claim 5, the set of instructions, which when executed by the processor, cause the processor to determine a positive-trending change based on the comparison and associate the positive-trending change with a right gaze.

8. An apparatus, comprising:
   a set of sensors comprising at least a first sensor and a second sensor coupled to a wearable frame, the first sensor to generate a raw bit stream based on measurement of an effect of an electric field to be generated by a biological eye, the first sensor and the second sensor positioned above a mid-point of a line of sight of the biological eye;
   a common sensor coupled to the wearable frame and disposed between the first sensor and the second sensor;
   a processor coupled to at least the first sensor and the common sensor; and
   a memory comprising a set of instructions, which when executed by the processor, cause the processor to:

determine a common electric potential associated with the biological eye based on output from the common sensor;

determine differential bit stream associated with the biological eye based on a difference between the raw bit stream and the common electrical potential; and generate a communication signal based on the determined differential bit stream.

9. The apparatus of claim 8, the set of instructions, which when executed by the processor, cause the processor to detect movement of the biological eye based the differential bit stream.

10. The apparatus of claim 8, the set of instructions, which when executed by the processor, cause the processor to determine an object of fixation or direction of gaze for the biological eye based on the differential bit steam.

11. The apparatus of claim 8, the set of instructions, which when executed by the processor, cause the processor to monitor fixation or gaze of the biological eye based on changes in electric potential induced by movement of the biological eye and measured by the set of sensors.

12. The apparatus of claim 8, the second sensor to generate a second raw bit stream based on measurement of an effect of the electric field of the biological eye at a position with respect to the biological eye different than that of the first sensor, the set of instructions, which when executed by the processor, cause the processor to determine a second differential bit stream associated with the biological eye based on a difference between the second raw bit stream and the common electrical potential.

13. The apparatus of claim 12, the set of instructions, which when executed by the processor, cause the processor to determine an electric potential between different portions of the biological eye based on the differential bit stream and the second differential bit stream.

14. The apparatus of claim 12, the set of instructions, which when executed by the processor, cause the processor to detect movement of the biological eye based on the differential bit stream and the second differential bit stream.

15. The apparatus of claim 12, the set of instructions, which when executed by the processor, cause the processor to generate the communication signal based on the differential bit stream and the second differential bit stream.

16. The apparatus of claim 12, the set of instructions, which when executed by the processor, cause the processor to determine an object of fixation or direction of gaze for the biological eye based on the differential bit steam and the second differential bit stream.

17. One or more non-transitory computer-readable media to store instructions that when executed by a processor circuit causes the processor circuit to:

determine a bridge electric potential associated with a first sensor coupled adjacent a bridge portion of a wearable frame;

determine a temple electric potential associated with a second sensor coupled adjacent a temple portion of the wearable frame, the first sensor and the second sensor disposed on the wearable frame above a mid-point of a line of sight of the wearable frame;

determine a common electric potential associated with a third sensor coupled to the wearable frame between the first and the second sensor;

determine a first differential value based on a difference in the bridge and common electric potentials;

determine a second differential value based on a difference in the temple and common electric potentials; and generate a conditioned bit stream based on the first differential value and the second differential value.

18. The one or more non-transitory computer-readable media of claim 17, with instructions to determine a first differential value based on a difference in the bridge and temple electric potentials and generate the conditioned bit stream based on the first differential value.

19. The one or more non-transitory computer-readable media of claim 18, with instructions to determine a second bridge electric potential associated with the first sensor and a second temple electric potential associated with the second sensor.

20. The one or more non-transitory computer-readable media of claim 19, with instructions to determine a second differential value based on a difference in the second bridge and second temple electric potentials and generate the conditioned bit stream based on the first and second differential values.

21. The one or more non-transitory computer-readable media of claim 20, with instructions to compare the first and second differential values and generate the conditioned bit stream based on the comparison.

22. The one or more non-transitory computer-readable media of claim 21, with instructions to determine a negative-trending change based on the comparison and associate the negative-trending change with a left gaze.

23. The one or more non-transitory computer-readable media of claim 21, with instructions to determine a positive-trending change based on the comparison and associate the positive-trending change with a right gaze.

* * * * *